United States Patent
An et al.

(12)

(10) Patent No.: US 7,957,770 B2
(45) Date of Patent: Jun. 7, 2011

(54) MOBILE COMMUNICATION TERMINAL FOR PROVIDING TACTILE INTERFACE

(75) Inventors: Hyunjun An, Seoul (KR); Ju-Nam Kim, Seoul (KR); Min Hak Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 552 days.

(21) Appl. No.: 11/955,300

(22) Filed: Dec. 12, 2007

(65) Prior Publication Data

US 2008/0161065 A1  Jul. 3, 2008

(30) Foreign Application Priority Data

Dec. 13, 2006 (KR) ......................... 10-2006-0127376

(51) Int. Cl.
*H04M 1/00* (2006.01)
(52) U.S. Cl. ..................... 455/567; 455/566; 455/550.1; 455/90.1
(58) Field of Classification Search .................. 455/567, 455/550.1, 566, 552.1, 556.2, 575.1, 90.2, 455/90.3, 90.1; 345/173, 179, 156
See application file for complete search history.

(56) References Cited

U.S. PATENT DOCUMENTS

| | | | |
|---|---|---|---|
| 2005/0054390 A1 | 3/2005 | Tuovinen | |
| 2005/0083314 A1* | 4/2005 | Shalit et al. | 345/179 |
| 2006/0049920 A1* | 3/2006 | Sadler et al. | 340/407.1 |
| 2007/0080951 A1* | 4/2007 | Maruyama et al. | 345/173 |

FOREIGN PATENT DOCUMENTS

| | | |
|---|---|---|
| CN | 1582465 | 2/2005 |
| DE | 4140780 | 9/1992 |
| EP | 1406150 | 4/2004 |
| EP | 1544720 | 6/2005 |
| WO | WO 2004/053670 | 6/2004 |

* cited by examiner

*Primary Examiner* — John Lee
(74) *Attorney, Agent, or Firm* — Lee, Hong, Degerman, Kang & Waimey (57) ABSTRACT

A mobile terminal for use in a wireless communication and method therein is provided. The mobile terminal includes a terminal body configured to house a mobile communication module to engage in the wireless communication, a touch input device disposed in the terminal body, the touch input device including a touch detection area configured to recognize an external contact, a vibrator coupled to the terminal body and is configured to allow tactile detection by a user, and a controller to control the touch input device and the vibrator, wherein the controller causes the vibrator to vibrate in response to detecting the external contact on the touch detection area and other mobile terminal functions that require a tactile alert.

16 Claims, 8 Drawing Sheets

MOBILE COMMUNICATION TERMINAL FOR PROVIDING TACTILE INTERFACE

CROSS-REFERENCE TO RELATED APPLICATION

Pursuant to 35 U.S.C. §119(a), this non-provisional patent application claims the benefit of the earlier filing date and right of priority of Patent Application No. 10-2006-0127376 filed in Republic of Korea on Dec. 13, 2006, the entire contents of which are hereby incorporated by reference.

FIELD OF THE INVENTION

The present invention is directed to a mobile terminal and, more particularly, to a mobile terminal capable of providing an effective user interface (UI) by providing feedback through vibration.

DESCRIPTION OF RELATED ART

Conventional mobile terminals generally include a vibration motor. By means of the vibration motor, the mobile terminal can provide tactile information according to vibration instead of audible information through a sound. For example, when a call or message is received, if the received call or message is informed to a user through a bell sound or voice in an area where people are requested to be quiet, the audible sound would be rude and make other people uncomfortable. Thus, in order to avoid such an embarrassing situation, the mobile terminal may be previously set in a vibration mode, so that the user can be informed of the received call or message through vibration.

However, the vibration motor of the related art mobile terminal is used only in the vibration mode of the mobile terminal, causing a problem that its usage range is limited.

Recently, mobile terminals equipped with a touch input device that senses an external contact as an input signal have been marketed to provide a fresh UI to users. However, the mobile terminals having the touch input device are disadvantaged in that when the user manipulates the touch input device, they cannot get feedback as to whether the input of information has been properly completed.

SUMMARY OF THE INVENTION

In one general aspect of the present invention configured for use in a wireless communication includes a terminal body configured to house a mobile communication module to engage in the wireless communication, a touch input device disposed in the terminal body, the touch input device including a touch detection area configured to recognize an external contact, a vibrator coupled to the terminal body and is configured to allow tactile detection by a user, and a controller to control the touch input device and the vibrator, wherein the controller causes the vibrator to vibrate in response to detecting the external contact on the touch detection area and other mobile terminal functions that require a tactile alert.

It is contemplated that the vibrator is disposed in a non-direct contact with the touch input device. It is further contemplated that the terminal body comprises a first body and a second body that are coupled to each other, the first body housing the touch input device and the second body housing the vibrator.

It is contemplated that the controller controls the vibrator to vibrate for a predetermined time in response to detecting the external contact. It is further contemplated that the controller controls the vibrator to vibrate while the external contact is detected.

It is contemplated that the other mobile terminal functions that require a tactile alert comprises at least one of incoming and outgoing calls, messages, alarm, and games. It is further contemplated that the controller controls vibration intensity of the vibrator in response to different mobile terminal functions.

It is contemplated that the controller causes the vibrator to vibrate at one of a plurality of intensity and duration in response to different touch locations. It is further contemplated that the external contact comprises activities that require a user interface.

In another general aspect of the present invention, a method for providing a user interface in a mobile terminal for a wireless communication is provided, the method includes recognizing a touch input in a touch detection area of a touch input device configured to recognize external contact, generating a vibration and allowing tactile detection by a user when external contact is recognized, wherein the vibration is generated from a vibrator disposed in a terminal body, and controlling the touch input device and the vibrator via a controller, wherein the controller causes the vibrator to vibrate in response to detecting the external contact on the touch detection area and other mobile terminal functions that require a tactile alert.

The foregoing and other objects, features, aspects and advantages of the present invention will become more apparent from the following detailed description of the present invention when taken in conjunction with the accompanying drawings.

BRIEF DESCRIPTION OF THE DRAWINGS

The implementation of this document will be described in detail with reference to the following drawings in which like numerals refer to like elements.

DETAILED DESCRIPTION OF PREFERRED EMBODIMENTS

In the following detailed description reference is made to the accompanying drawing figures which form a part hereof and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

Figure 1:
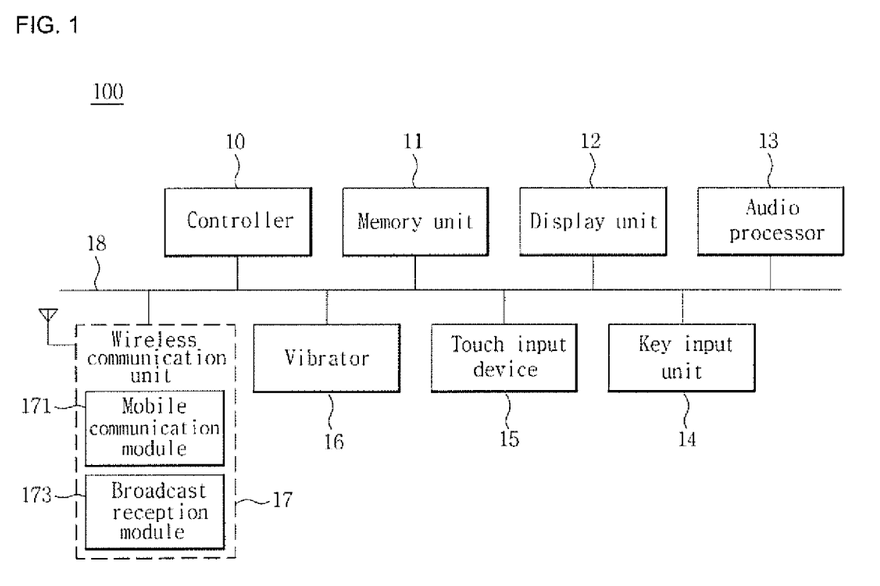
FIG. 1 is a schematic block diagram of a mobile terminal according to an embodiment of the present invention.

FIG. 1 is a schematic block diagram of a mobile terminal according to one an embodiment of the present invention. With reference to FIG. 1, basic functions of the elements of the mobile terminal according to an embodiment of the present invention will now be described.

The mobile terminal 100 in accordance with the present invention includes a controller 10, a memory unit 11, a display unit 12, an audio processor unit 13, a key input unit 14, a touch input device 15, and a vibrator 16. Respective elements are connected by a bus 18.

The memory unit 11 stores a certain program controlling a general operation of the mobile terminal 100, and also stores various data inputted and outputted or processed when the general operation of the mobile terminal 100 is performed under the control of the controller 10.

The display unit 12 may display a state of the mobile terminal 100 and various information according to a control signal outputted from the controller 10.

The audio processor unit 13 processes audio signals such that sounds can be inputted or outputted via a microphone MIC and a speaker SPK. For example, the audio processor unit 13 processes audio signals such that various processing and controlling operations of the mobile terminal 100 can be outputted as sounds via the speaker SPK. The audio processor also processes audio signals such that various information or commands can be inputted via the microphone MIC.

The key input unit 14, which receives information or commands from a user, may be implemented as a keypad including various number keys or direction keys. The touch input device 15, which also receives information or commands from the user, senses an external contact as an input signal. Particularly, the touch input device 15 may comprise a plurality of touch points and sense an external contact with each touch point as a different input signal.

The vibrator 16 is a module comprising a vibration motor and a vibration element configured to generate vibration to make the mobile terminal 100 vibrate according to a control signal from the controller 10. The vibrator 16 is disposed in a non-direct contact configuration with the touch input device 15. The disposition relationship of the vibrator 16 and the touch input device 15 will be described later with reference to FIGS. 2 to 4.

The controller 10 controls the elements and the general operation of the mobile terminal 100 according to the present invention.

The mobile terminal 100 according to an embodiment of the present invention includes a wireless communication unit 17. The wireless communication unit 17 includes a mobile communication module 171, such as a wireless communication device for transmitting and receiving data to and from a mobile communication network. The wireless communication unit 17 may also include a broadcast reception module 173, such as a wireless communication device for receiving a broadcast signal from a broadcast network.

Figure 2:
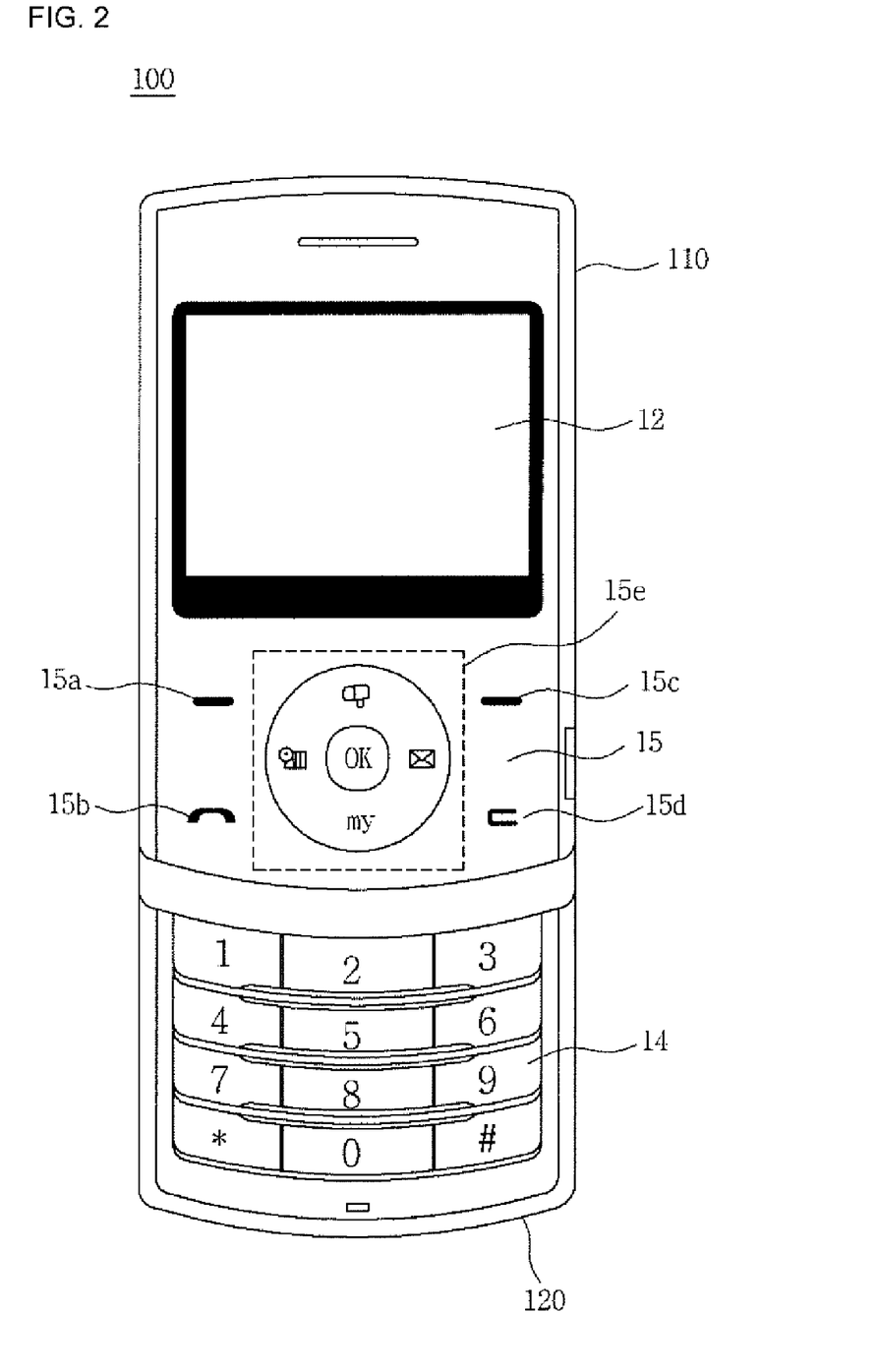
FIG. 2 illustrates a front view of the mobile terminal according to an embodiment of the present invention.
Figure 3:
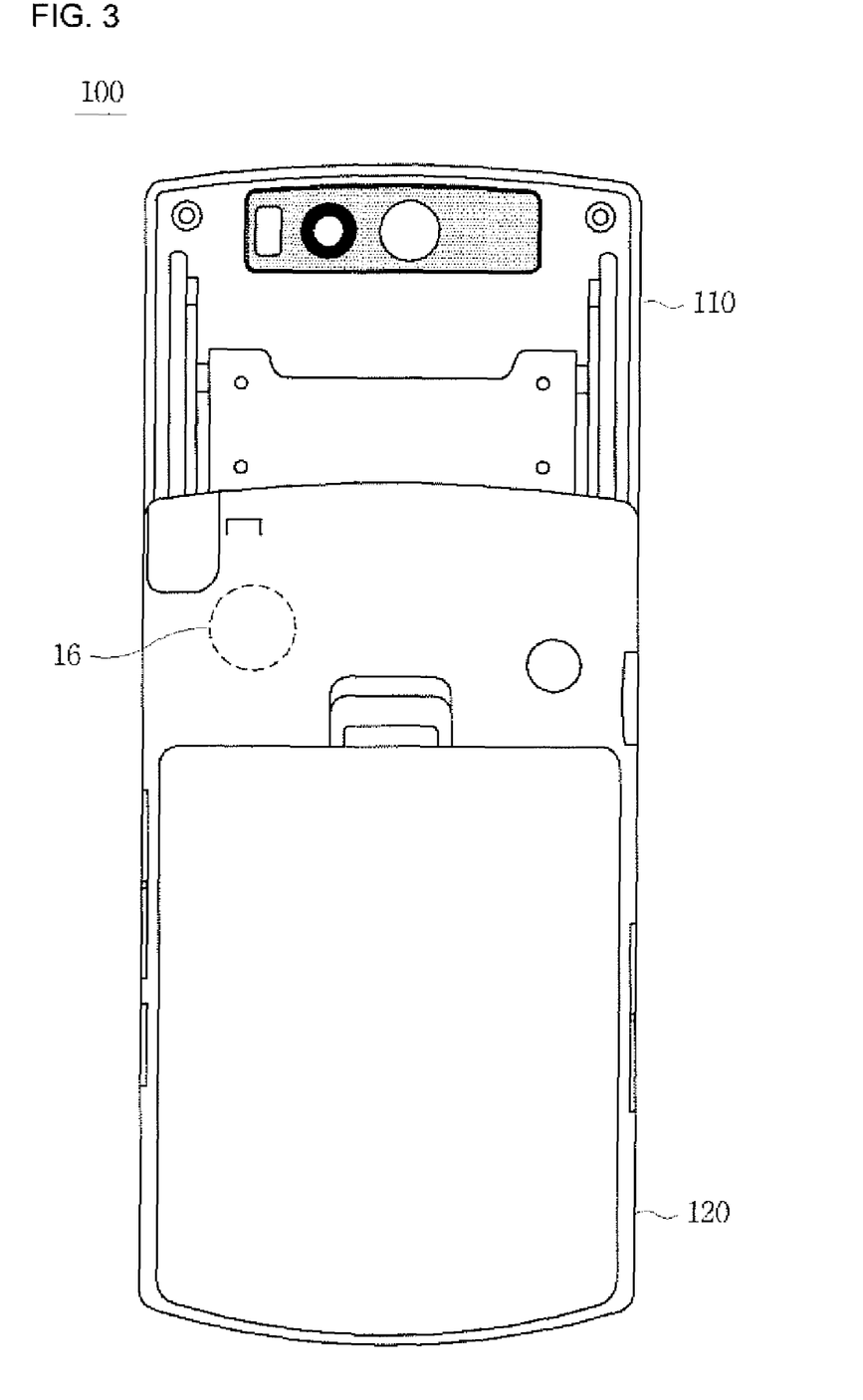
FIG. 3 illustrates a rear view of the mobile terminal according to the embodiment of the present invention.
Figure 4A:
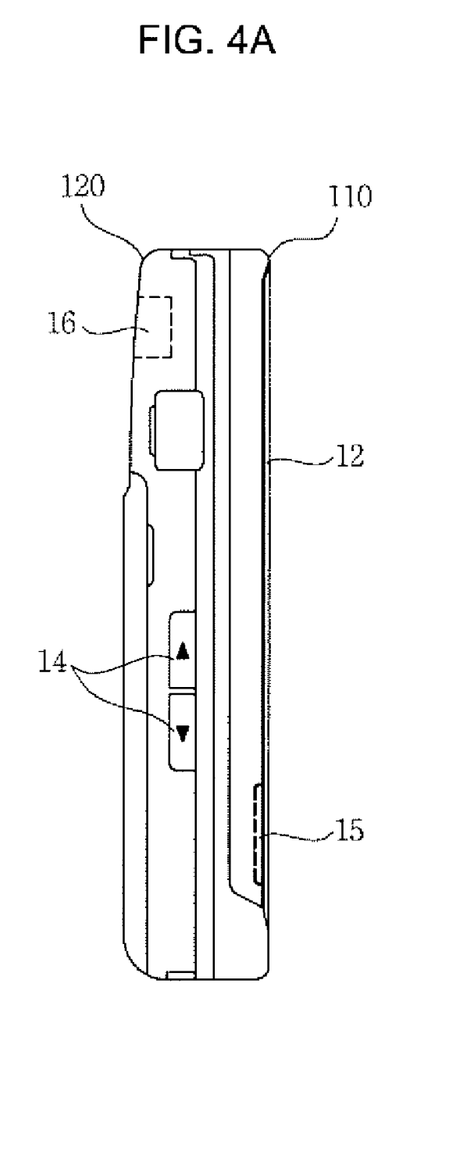
FIGS. 4A and 4B are left and right side views of the mobile terminal according to one exemplary embodiment of the present invention.
Figure 4B:
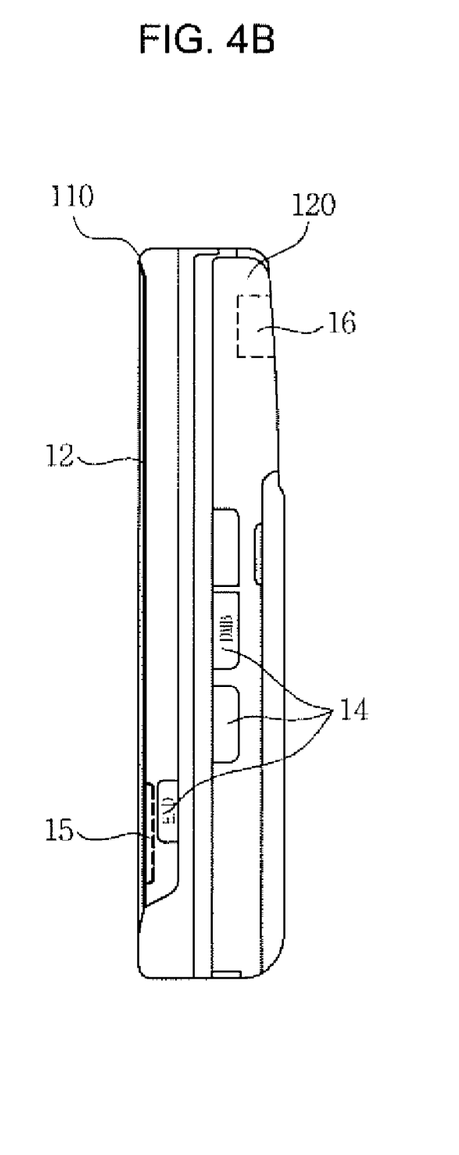
Figure 5:
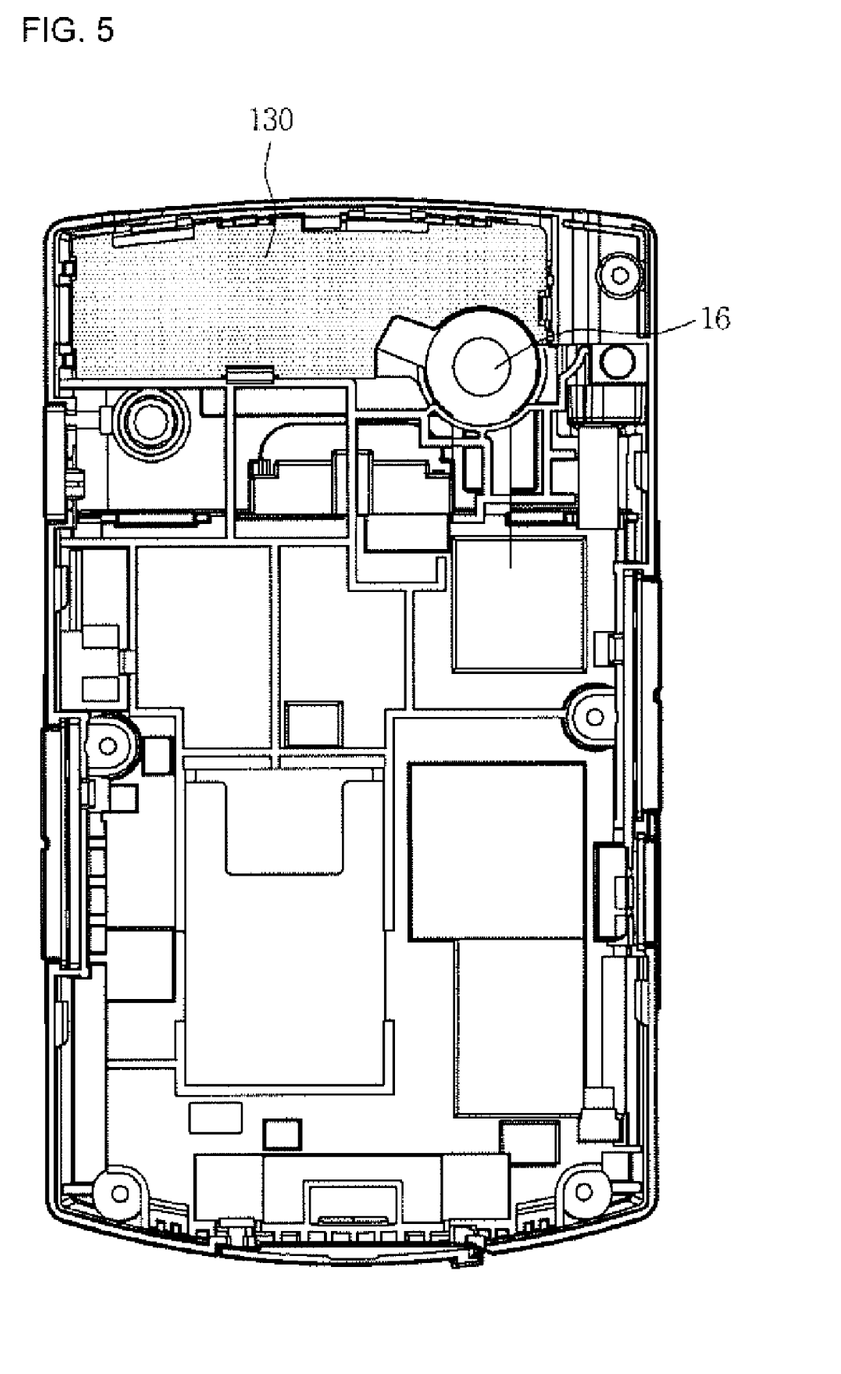
FIG. 5 depicts the interior of the mobile terminal according to an embodiment of the present invention.

The operation of the mobile terminal will now be described in detail with reference to FIGS. 2-5. FIG. 2 illustrates a front view of the mobile terminal 100 according to an embodiment of the present invention. FIG. 3 illustrates a rear view of the mobile terminal according to the embodiment of the present invention. FIGS. 4A and 4B are, respectively, left and right side views of the mobile terminal according to an embodiment of the present invention. FIG. 5 depicts the internal assembly of the mobile terminal according to an embodiment of the present invention.

As illustrated in FIGS. 2-4B, the mobile terminal 100 according to an embodiment of the present invention depicts a slide type configuration having two bodies 110 and 120, but the present invention is not limited thereto. The mobile terminal 100 may be implemented as a slide type, a folder type, or a combination of slide type and folder type according to the construction of a hinge part connecting the two bodies. In the present embodiment of the present invention, the slide type mobile terminal as shown in FIGS. 2 to 4 will be taken as an example, but the present invention is not limited thereto. The slide type mobile terminal comprises a slider serving as a cover and a main body. With reference to FIGS. 2 to 4, reference numeral 110 denotes a slider and reference numeral 120 denotes a main body or a terminal body, on which the following description will be made.

Regarding the mobile terminal 100, the slider 110 comprises a display unit 12 formed at an upper portion and a touch input device 15 formed at a lower portion of the slider. The display unit 12 may comprise a touch screen for sensing touch input.

As described above and as shown in FIG. 2, the touch input device 15 may comprise a plurality of touch points 15a-15e. The controller 10 recognizes each external contact of the respective touch points 15a-15e as an input of each different information. For example, when the user touches a contact point 15b with his finger, a call function or a message transmission function is performed through the mobile communication network by using the mobile communication module 171. In addition, if the user touches the contact point 15d with his finger, a function being currently performed is stopped. As stated above, the touch input device 15 and the vibrator 16 are disposed in the non-direct contact configuration. As shown in FIG. 4, the touch input device 15 is formed at the slider 110 while the vibrator 16 is formed at the main body 120, so the touch input device 15 and the vibrator 16 are not in direct contact.

With reference to FIG. 5, the vibrator 16 is preferably installed in the main body 120 in a recess formed at an area 130 of an internal antenna, which is referred to as an intenna. With reference to FIG. 4, the vibrator 16 may be configured to contact the main body 120 to maximize a vibration sense when the user holds the mobile terminal 100 in hand.

In general, when the user holds the mobile terminal 100 in hand, the main body 120 contacts the user's hand and the slider 110 displays various information to the user through the display unit 12. Because the vibrator 16 is formed at the main body 120 contacting the user's hand, when vibration is generated the vibration or tactile sense can be more effectively transferred to the user compared, as opposed to the configuration where the vibrator 16 is formed together with the touch input device 15 at the slider 110.

When an input signal is received through the touch input device 15, the controller 10 controls the vibrator 16 to generate vibration. Because the touch input device 15 and the vibrator 16 are separately configured at different bodies of the mobile terminal 100, the vibration generated by the vibrator 16 can be transferred to the touch input device 15 through the different bodies. Examples of the configurations are described as follows.

In a first example, the user may hold the mobile terminal in his left hand and manipulate the touch input device 15 with the fingers of their right hand. When the user touches a certain touch point (e.g., 15a), the controller 10 controls the vibrator 16 to generate vibration. With reference to FIG. 4, the vibration generated by the vibrator 16 primarily vibrates the main body 120, transferring the direct vibration sense to the user's left hand. Then, the vibration is secondarily transferred to the touch input device 15 through the main body 120 and the slider 110, and finally to the user's fingers on their right hand.

In a second example, the user may hold the mobile terminal in his right hand and manipulate the touch input device 15 with his fingers of right hand. When vibration is generated by the vibrator 16, as described above, the generated vibration is primarily transferred to the user's right hand through vibration of the main body 120, and then to the user's fingers of their right hand that are manipulating the touch input device 15 by vibration of the slider 110.

Herein, although it has been described such that the vibration is transferred through each element based on the concept of primary, secondary and final transfer in the temporal order, the user would feel the vibrations almost simultaneously. As described in detail below, the vibrator 16 may generate vibration variably.

First, the controller 10 may control the vibrator 16 to generate vibration while an external contact is being sensed by the touch input device 15. Namely, vibration is continuously generated while the user's finger is kept putting on a particular touch point of the touch input device 15.

Second, the controller 10 may control the vibrator 16 to generate vibration during a predetermined vibration time whenever an external contact is sensed by the touch input device 15. That is, regardless of time duration which the user's finger is kept on the particular touch point of the touch input device 15, vibration may be generated only for the predetermined vibration time with respect to one-time external contact with the particular touch point. The vibration time duration may be determined to be variable, for example, within the range of about 40 ms to 100 ms (millisecond).

The controller 10 may control the intensity and duration of the vibration. For example, the intensity of vibration may be set to be different at every touch point. Similarly, the duration of the vibration may be set differently for different touch points. Furthermore, different vibration may be used for various mobile terminal functions, such as alarm, game, incoming/outgoing messages, and calls, etc.

The vibrator 16 according to the present embodiment of the invention may be used for a different function requiring vibration, as well as for the function of providing feedback on the external input through the touch input device 15, as described above.

In particular, the controller 10 may control the vibrator 16 to generate vibration when a call or a message is received through the mobile communication module 171, to thereby inform the user of the reception of the call or the message through vibration.

In order to inform the user of the received call or message, generally, there can be a method for providing visual information through the display unit, audible information through the audio processor unit 13, and tactile information through vibration of the vibrator 16, etc.

In order to provide the tactile information, the mobile terminal 100 needs to be set to be in the vibration mode. In the vibration mode, the mobile terminal provides tactile information through the vibrator 16 instead of providing audible information through the audio processor unit 13. For example, in addition to providing information of the received call or message, an alarm may be set.

In the present embodiment, the vibrator 16 may operate not only to perform the function of the general vibration mode of the mobile terminal 100 but also to provide feedback on receipt of an input signal through the touch input device 15.

The embodiments of a method for providing a UI in the mobile terminal according to the present invention will now be described. The method for providing a UI according to the present invention may be implemented by the mobile terminal as shown in FIGS. 1-6. Herein, the purposeful use of the term 'mobile communication terminal' is to emphasize the fact that it is a mobile terminal which is capable of performing the communication function with the mobile communication module 171 provided therein.

As described above, the vibrator 16 is a module comprising a vibration motor and a vibration element configured to generate vibration to make the terminal 100 vibrate according to a control signal from the controller 10.

Figure 6:
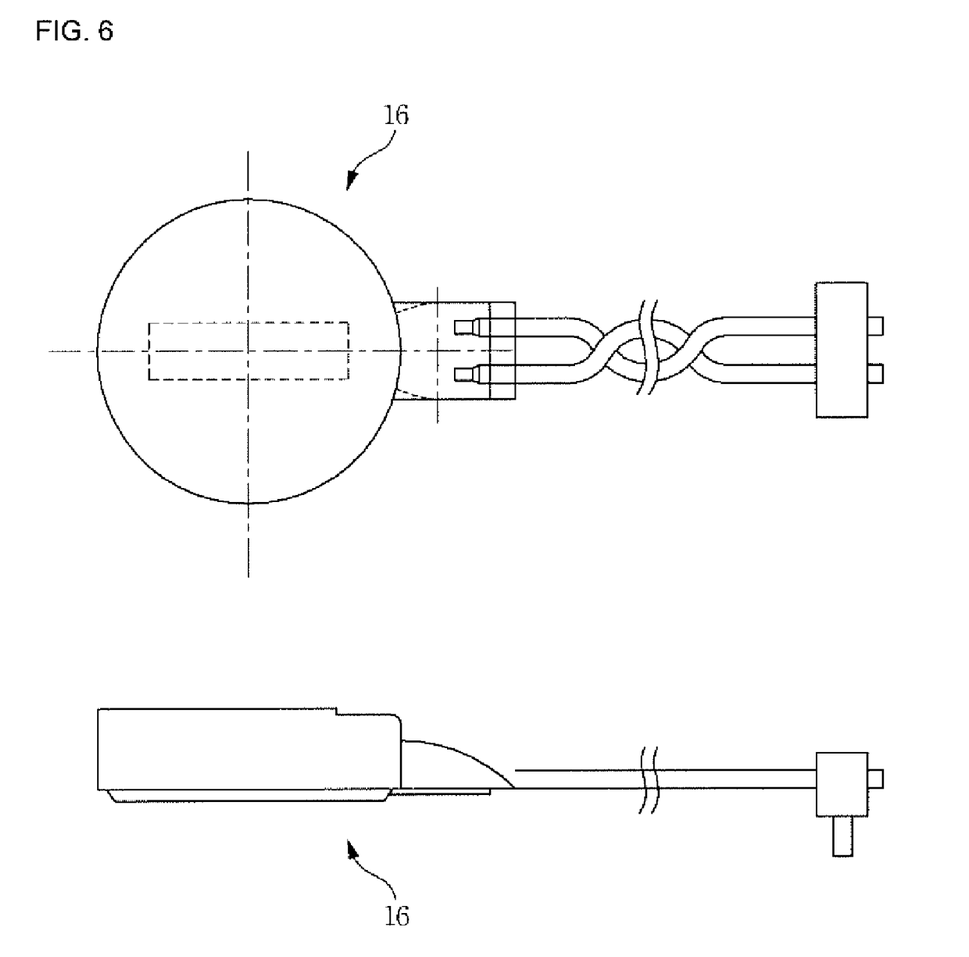
FIG. 6 is a schematic of a vibration motor according to an embodiment of the present invention.

FIG. 6 is a schematic of a vibration motor as disposed in the mobile terminal 100 in accordance to an embodiment of the present invention.

Figure 7:
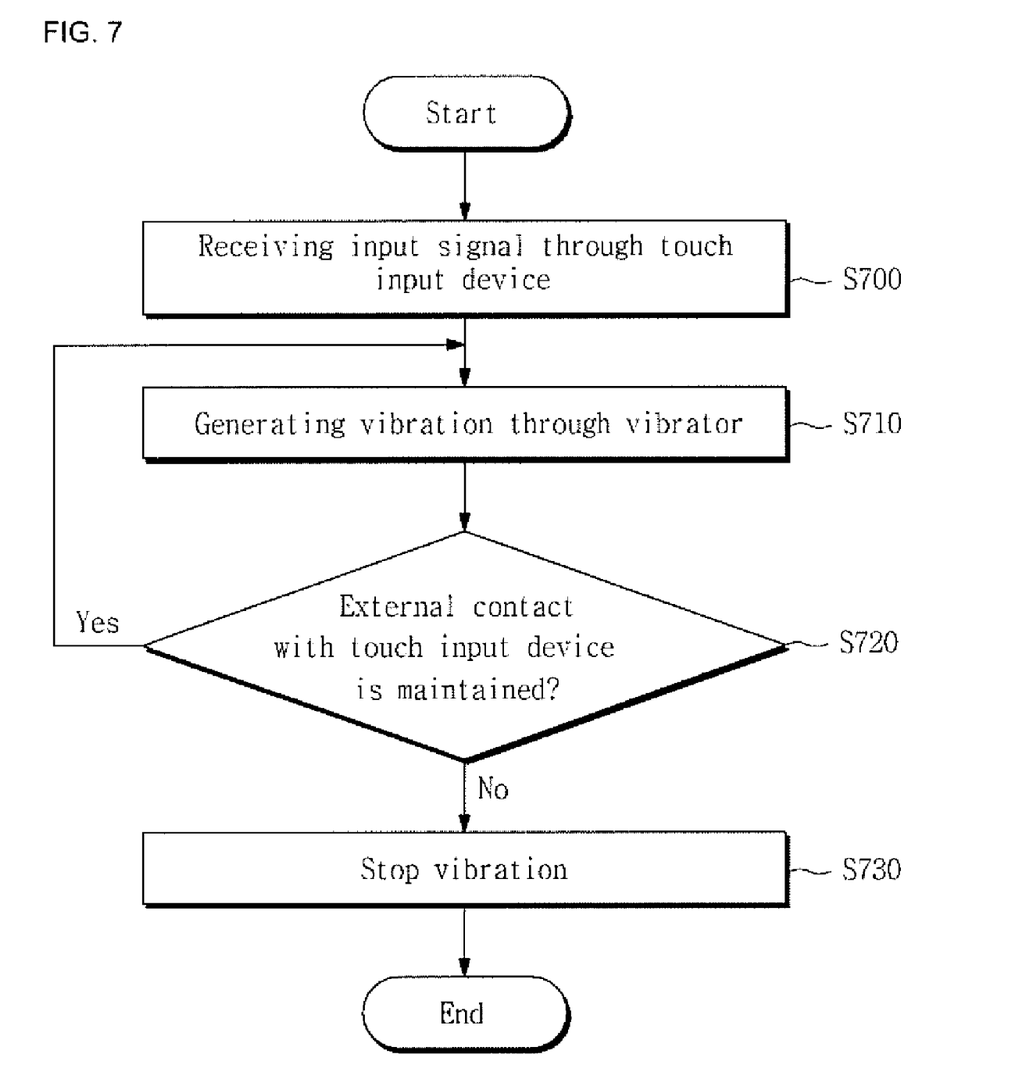
FIG. 7 is a flow chart illustrating the process for providing user interface (UI) in a mobile terminal according to an embodiment of the present invention.

FIG. 7 is a flow chart illustrating the process for providing a UI in the mobile communication terminal according to an embodiment of the present invention. The method for providing the UI in the mobile communication terminal according to the embodiment of the present invention will now be described in detail.

First, an input signal is received through the touch input device 15 (S700). For example, when an external contact with the touch input device 15 is exerted, the external contact is recognized as an input signal. When the touch input device 15 includes the plurality of touch points 15a-15e, as shown in FIG. 1, each touch point can be recognized as an input corresponding to different information.

Vibration is generated by the vibrator 16 according to the reception of the input signal (S710), when it is determined the external contact with the touch input device 15 is maintained (S720). When the external contact is maintained, the process returns to the vibration generation (S710), otherwise, the vibration generation is stopped (S730). While external contact is sensed by the touch input device 15, the vibrator 16 continuously generates vibration.

Figure 8:
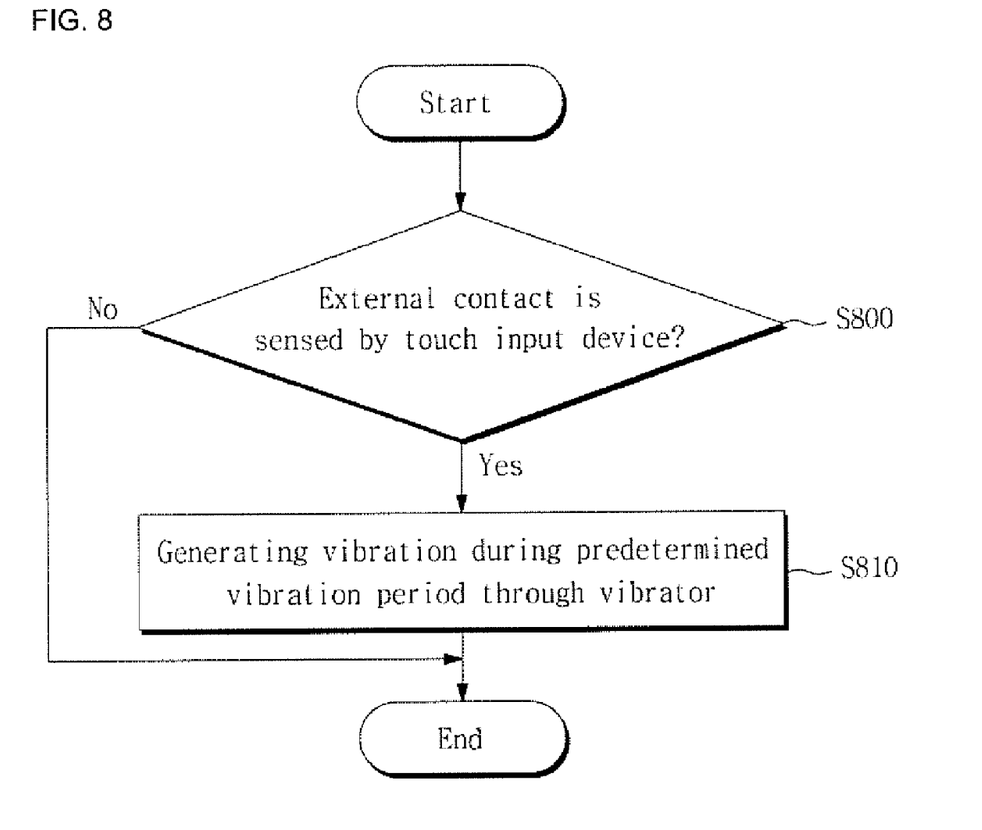
FIG. 8 is a flow chart illustrating another process for providing a UI in a mobile communication terminal according to an embodiment of the present invention.

FIG. 8 is a flow chart illustrating a process for providing a UI in the mobile communication terminal according to another embodiment of the present invention. The method for providing a UI in the mobile communication terminal according to another exemplary embodiment of the present invention will now be described in detail.

First, it is determined whether external contact is sensed by the touch input device 15 (S800). When an external contact is sensed, vibration is generated during a certain time period through the vibrator 16 (S810). More specifically, whenever an external contact is sensed by the touch input device 15 vibration may be generated during the predetermined vibration time period.

As described above, the mobile terminal and the method for providing a UI using the same according to the present invention has the following advantages.

First, when the user manipulates the touch input device such as the touch pad or the touch screen, feedback can be provided through vibration to inform the user that the corresponding input has been completed.

Second, the vibrator 16, which was merely used to provide information regarding the reception of a call, a message or alarm in the related art, can be used to provide feedback on the user manipulation of the touch input device.

Third, because the vibrator can be used to provide feedback on the manipulation of the touch input device, the number of components of the mobile terminal and the body thickness of the mobile terminal can be reduced, and thus, the fabrication cost can be reduced.

Fourth, because the touch input device and the vibrator are formed at different bodies, the vibration intensity that the user may feel can be increased, that is, the user may experience intense vibration in providing the feedback on the manipulation of the touch input device through vibration.

Although certain embodiments of the present invention have been disclosed for illustrative purposes, those skilled in the art will appreciate that various modifications, additions and substitutions are possible, without departing from the scope of the invention. Accordingly, the embodiments of the present invention are not limited to the above-described embodiments, but are defined by the claims which follow, along with their full scope of equivalents.

What is claimed is:

1. A mobile terminal configured for use in wireless communication, the mobile terminal comprising:
   a terminal body configured to house a mobile communication module to engage in the wireless communication;
   a touch input device disposed in the terminal body, the touch input device comprising a touch detection area configured to recognize an external contact;
   a vibrator coupled to the terminal body and configured to allow tactile detection by a user; and
   a controller configured to control the touch input device and the vibrator,
   wherein the controller causes the vibrator to vibrate in response to detecting the external contact on the touch detection area independent of whether the mobile terminal is set in a vibration mode and further causes the vibrator to vibrate in response to other mobile terminal functions received independent of the touch input device which comprise at least incoming and outgoing calls, messages, an alarm or a game when the mobile terminal is set in the vibration mode.

2. The mobile terminal of claim 1, wherein the vibrator is disposed in a non-direct contact with the touch input device.

3. The mobile terminal of claim 1, wherein the terminal body comprises a first body and a second body that are coupled to each other, the first body housing the touch input device and the second body housing the vibrator.

4. The mobile terminal of claim 1, wherein the controller controls the vibrator to vibrate for a predetermined time in response to detecting the external contact.

5. The mobile terminal of claim 1, wherein the controller controls the vibrator to vibrate while the external contact is detected.

6. The mobile terminal of claim 1, wherein the controller controls vibration intensity of the vibrator in response to different mobile terminal functions.

7. The mobile terminal of claim 1, wherein the controller causes the vibrator to vibrate at one of a plurality of intensities and durations in response to different touch locations.

8. The mobile terminal of claim 1, wherein the external contact comprises activities that require a user interface.

9. A method for providing a user interface in a mobile terminal for wireless communication, the method comprising:
   recognizing a touch input in a touch detection area of a touch input device configured to recognize an external contact;
   generating a vibration and allowing tactile detection by a user when the external contact is recognized, wherein the vibration is generated from a vibrator disposed in a terminal body; and
   controlling the touch input device and the vibrator via a controller, wherein the controller causes the vibrator to vibrate in response to detecting the external contact on the touch detection area independent of whether the mobile terminal is set in a vibration mode and further causes the vibrator to vibrate in response to other mobile terminal functions received independent of the touch input device which comprise at least incoming and outgoing calls, messages, an alarm or a game when the mobile terminal is set in the vibration mode.

10. The method of claim 9, wherein the vibrator is disposed in a non-direct contact with the touch input device.

11. The method of claim 10, wherein the terminal body comprises a first body and a second body that are coupled to each other, the first body housing the touch input device and the second body housing the vibrator.

12. The method of claim 9, wherein the controller controls the vibrator to vibrate for a predetermined time in response to detecting the external contact.

13. The method of claim 9, wherein the controller controls the vibrator to vibrate while the external contact is detected.

14. The method of claim 9, wherein the controller controls vibration intensity of the vibrator in response to different mobile terminal functions.

15. The method of claim 9, wherein the controller causes the vibrator to vibrate at one of a plurality of intensities and durations in response to different touch locations.

16. The method of claim 9, wherein the external contact comprises activities that require a user interface.

* * * * *